Figure 1:
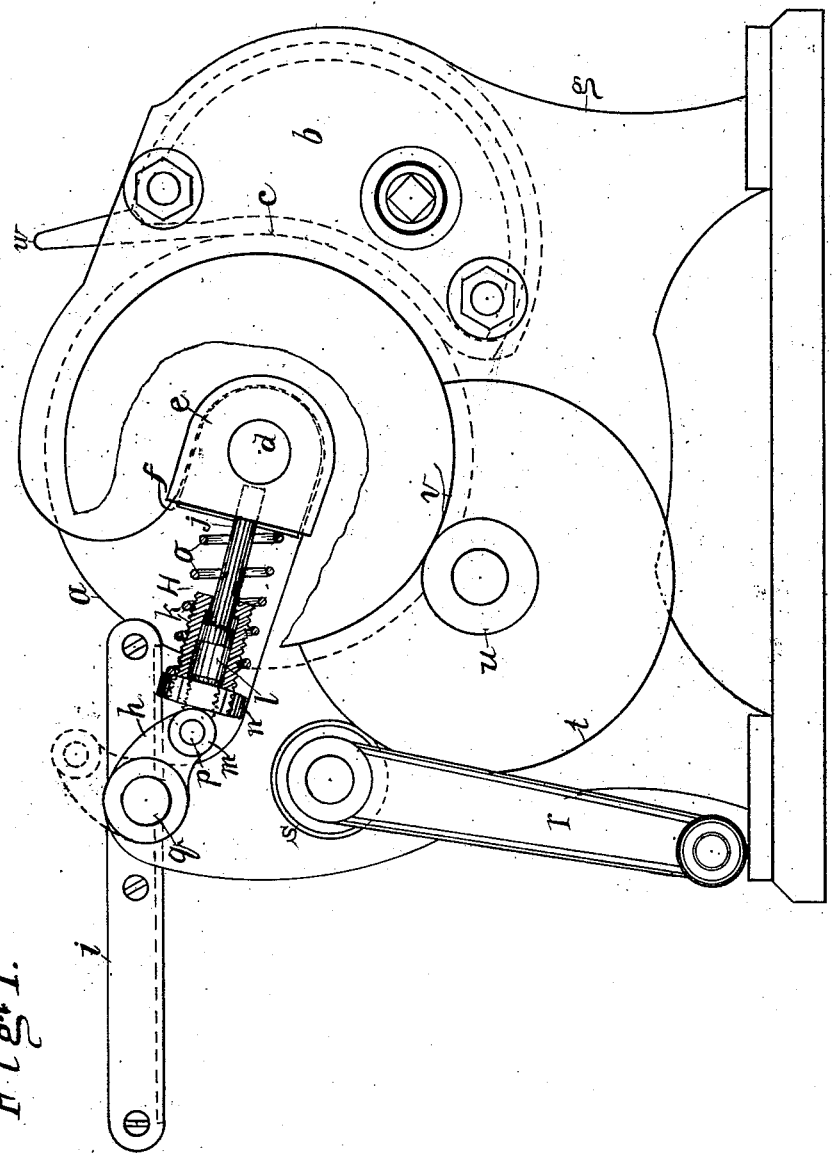

No. 859,290. PATENTED JULY 9, 1907.
H. G. GROSSE & W. FRENCH.
IRONING MACHINE.
APPLICATION FILED JUNE 21, 1905.

2 SHEETS—SHEET 1.

Witnesses.
Lewis F. Clarke
Wm. H. Hall

Inventors.
Herman G. Grosse,
Walter French
By Wm. Zimmerman,
Attorney.

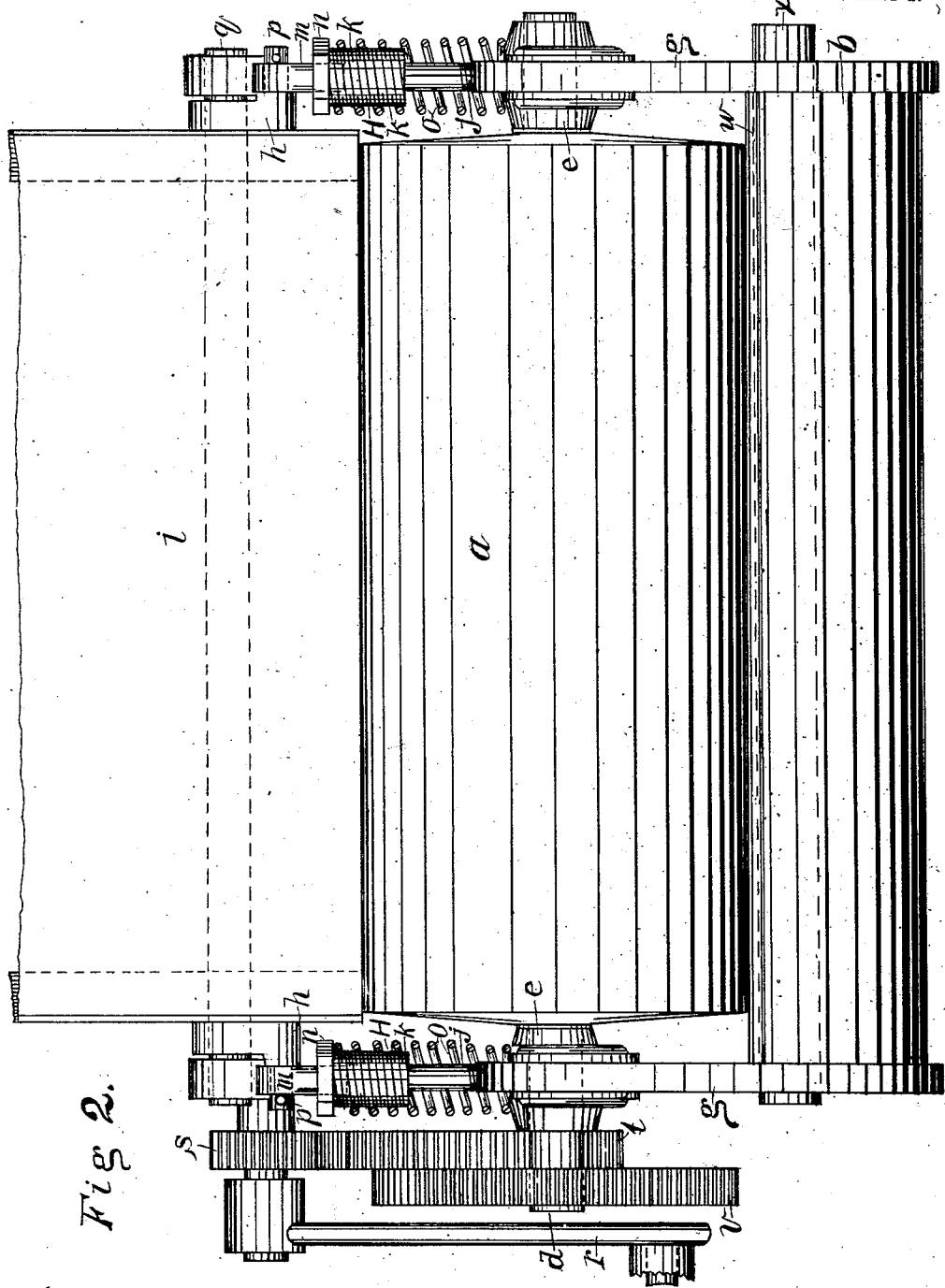

UNITED STATES PATENT OFFICE.

HERMAN G. GROSSE AND WALTER FRENCH, OF CHICAGO, ILLINOIS.

IRONING-MACHINE.

No. 859,290.      Specification of Letters Patent.      Patented July 9, 1907.

Application filed June 21, 1905. Serial No. 266,198.

REISSUED

To all whom it may concern:

Be it known that we, HERMAN G. GROSSE and WALTER FRENCH, both citizens of the United States, and residents of Chicago, Illinois, have invented certain new and useful Improvements in Ironing-Machines for Laundry Use, of which the following is a full, clear, and correct description, reference being had to the accompanying two sheets of drawings, forming a part hereof, and in which—
Figure 1 shows our said new device in end view, apart of the new mechanism being shown in section; and Fig. 2 shows said device in plan view, as seen looking down on it.

Like reference letters denote like parts in each figure.
A large part of the central part of the wheel $v$ is shown broken away to expose the adjusting-mechanism H, which is composed of the several parts $k, j, o, n, l,$.

In Fig. 1 the several gear-wheels $s, t, u, v$, are indicated by their pitch circles. In Fig. 2 their teeth are shown.
In the latter figure the springs $o$ are also shown in section for the purpose of more clearly showing the parts within said coiled springs.

The object of our invention is, more specifically, to produce a small or family ironing-machine although the machine may be built of any desired dimensions, and our more specific object is to be able to separate the contacting heating and drum surfaces and to make the pressure between said parts adjustable as well as relievable.

To attain said desirable ends we construct our said machine in substantially the following manner, namely: We make a rotary central drum or padded cylinder $a$ to one side of which we place a metal heating-chamber $b$ having a concave side $c$ with which it contacts with said drum. Said drum has an axle $d$ which runs in bearings $e$ which, said bearings, reciprocate in slots $f$ in the end-pieces or standards $g$. Said bearings are attached to connecting-mechanisms H which connect said bearings and the levers $h$, provided with crank-pins $p$, which form a part of a partially rotatable table $i$ which is held between said levers and fulcrums on a shaft $q$ and fixedly connected to said levers. Said connecting mechanism consists of a headed rod $j$ secured to the cylinder bearing $e$ after it has passed through a cylinder $k$ whereof the lower end is bored for said rod and through which said rod $j$ passes, its head playing in a chamber $l$ in said cylinder.

The upper end of the sleeve $k$ is threaded, internally, to receive the body of the eye-bolt $m$ which thus is fixedly secured to said sleeve. The outer surface of said sleeve is also threaded and provided with a nut $n$ and against the nuts $n$ and bearings $e$ press the ends of coiled wire springs $o$ which surround said rods and sleeves and by means of said nuts the spring pressure between said bearings and nuts may be adjusted and, thereby, the pressure of said drum $a$ against the ironing-chamber $b$ is regulated. The eye $m$ of said mechanism H hitches onto a crank-pin $p$ which forms part of the lever $h$, and between the levers $h$ is held a feeding-table $i$. The pin $p$, relative to the fulcrum $q$ is so placed that it is, alternately, above and below a plane which passes through the axis of said fulcrum and the axis of the mangle-drum, whereby when the pin is below said plane, owing to the pressure of said spring, or springs $o$ said table $i$ and cylinder $a$ are held in their respective places, and the table remains in its position, steadily, while the thereto connected drum yields to its work.

The crank $r$ is applied to a pinion $s$ which drives an intermediate gear-wheel $t$ to which is connected a pinion $u$ which works the gear-wheel $v$ on the shaft $d$ of the ironing cylinder or drum $a$. The slot $f$ in which the box or boxes $e$ reciprocate is so cut or placed as to keep the teeth of the wheels $u$ and $v$ in constant engagement.

When the levers $h$ are turned on their fulcrum $q$ to the position indicated in the broken outlines, above the table $i$ the spring-force of the connecting mechanism H is released and the boxes $e$ are drawn away from the lower ends of the slots $f$ and thereby the ironing cylinder $a$ is drawn away from the heated surface $c$ of the heating chamber $b$ and, thereby, the said cylinder saved from becoming overheated while standing idle.

In this machine the work passes over the table $i$ and over the top of the drum and is caught by the lip or ledge $w$, which projects over the top of the heater $b$ and which, as here shown, forms a part of said heater, and then the friction of the padded drum $a$ passes it down on one side of said drum and back and out towards the feeding table as it is discharged from the machine.

A pipe $x$ forms the burner for gas in the heating chamber.

In the most effective construction, as here shown, the axis of the drum $a$ is about ten to twenty degrees above the longitudinal central axis of the surface $c$ or longitudinal axis of the chamber $b$, in which situation the heat still catches the drum strongly and at the same time the parts $i, a, b,$ are situated in a nearly horizontal position; one in which it is the most easy to handle the work and at the same time give the best heat results.

What we claim is:

1. The combination with a reciprocable drum and a heating-chamber behind said drum, of a shaft-borne rotary feeding-table in front of said heater and drum, cranks to the ends of said shaft, and yielding connecting-mechanism between the crank-pins of said cranks and shaft-bearings of said drum, to forcibly contact and to separate said heater and drum and to fix the position of said table by the position of said drum.

2. The combination with a reciprocable drum and a heating-chamber behind said drum, of a shaft-borne rotary feeding-table in front of said heater and drum, cranks to the ends of said shaft and yielding connecting-mechanism between the crank-pins of said cranks and shaft-bearings of said drum, said crank-pins set to be below a plane passing through the axes of the table-shaft and drum when the table is horizontal and to be above said plane when the table is vertical and the drum and its heater are separated.

HERMAN G. GROSSE.
WALTER FRENCH.

Witnesses:
 WM. ZIMMERMAN,
 C. K. MITCHELL.